(12) United States Patent
Diochon et al.

(10) Patent No.: US 7,740,200 B2
(45) Date of Patent: Jun. 22, 2010

(54) AIRCRAFT ENGINE ASSEMBLY

(75) Inventors: Lionel Diochon, Toulouse (FR); Jerome Durand, Leguevin (FR)

(73) Assignee: Airbus France, Toulouse (FR)

( * ) Notice: Subject to any disclaimer, the term of this patent is extended or adjusted under 35 U.S.C. 154(b) by 355 days.

(21) Appl. No.: 11/572,213

(22) PCT Filed: Aug. 3, 2005

(86) PCT No.: PCT/FR2005/050644

§ 371 (c)(1),
(2), (4) Date: Jan. 17, 2007

(87) PCT Pub. No.: WO2006/090031

PCT Pub. Date: Aug. 31, 2006

(65) Prior Publication Data

US 2008/0042008 A1    Feb. 21, 2008

(30) Foreign Application Priority Data

Aug. 5, 2004    (FR)    ................................ 04 51790

(51) Int. Cl.
*B64D 27/00*    (2006.01)
(52) U.S. Cl. .......................................... 244/54; 244/55
(58) Field of Classification Search ................ 244/54, 244/55, 53 R
See application file for complete search history.

(56) References Cited

U.S. PATENT DOCUMENTS

| 3,848,832 A | 11/1974 | Stanley et al. |
| 3,952,973 A | 4/1976 | James |
| 3,979,087 A | 9/1976 | Boris et al. |
| 4,013,246 A * | 3/1977 | Nightingale ................ 244/54 |
| 4,266,741 A | 5/1981 | Murphy |

FOREIGN PATENT DOCUMENTS

FR    2 732 947    10/1996

OTHER PUBLICATIONS

U.S. Appl. No. 11/914,327, filed Nov. 13, 2007, Diochon, et al.
U.S. Appl. No. 11/632,077, filed Jan. 10, 2007, Diochon, et al.
U.S. Appl. No. 11/572,003, filed Jan. 12, 2007, Diochon, et al.
U.S. Appl. No. 11/571,666, filed Jan. 5, 2007, Diochon, et al.

* cited by examiner

*Primary Examiner*—Tien Dinh
*Assistant Examiner*—Joseph W Sanderson
(74) *Attorney, Agent, or Firm*—Oblon, Spivak, McClelland, Maier & Neustadt, L.L.P.

(57) ABSTRACT

An engine assembly for aircraft including a turbojet, an attachment strut, and a plurality of engine mounts interposed between the attachment strut and the turbojet. Each of the engine mounts is attached to a fan casing of the turbojet.

16 Claims, 8 Drawing Sheets

AIRCRAFT ENGINE ASSEMBLY

TECHNICAL FIELD

The present invention concerns, in a general manner, an engine assembly for aircraft, of the type comprising a turbojet, an attachment strut, as well as a plurality of engine mounts interposed between said attachment strut and the turbojet.

STATE OF THE PRIOR ART

In a known manner, the attachment strut of such an engine assembly is provided to constitute the liaison interface between an engine, of the turbojet type, and a wing of the aircraft equipped with said assembly. It makes it possible to transmit, to the structure of said aircraft, the stresses generated by its associated engine, and it also allows the routing of the fuel, electrical systems, hydraulics, and air between the engine and the aircraft.

In order to assure the transmission of stresses, the strut comprises a rigid structure, for example of the "box" type, in other words formed by the assembly of spars and lateral panels joined to each other through the intermediary of cross ribs.

A mounting system is interposed between the engine and the rigid structure of the strut, said system comprising overall a plurality of engine mounts, normally divided up into forward mount(s) integral with the fan casing of the engine and rear mount(s) integral with the delivery casing of said same engine.

Moreover, the mounting system comprises a device for taking up thrust stresses generated by the engine. In the prior art, said devices take for example the form of two lateral connecting rods attached on the one hand to a rear part of the fan casing of the engine, and on the other hand to a mount assembled on the rigid structure of the strut, for example a rear mount.

By way of indication, it is pointed out that the attachment strut is associated with a second mounting system interposed between said strut and the wing of the aircraft, said second system normally being composed of two or three mounts.

Finally, the strut is provided with a secondary structure assuring the segregation and the support of systems while at the same time bearing the aerodynamic fairings.

In a manner known to those skilled in the art, despite the presence of the device for taking up thrust stresses, said thrust stresses generated by the engine normally lead to a more or less important longitudinal flexing of said engine, namely a flexing resulting from a torque exerted along a transversal direction of the aircraft.

When this type of longitudinal flexing occurs, particularly during the cruising phases of the aircraft, high friction then arises between the turning compressor and turbine blades and the delivery casing of the engine.

Moreover, it is noted that the above mentioned longitudinal flexing phenomenon, and thus the phenomenon of friction of the turning blades, is greatly accentuated by the fact that on present turbojets, aiming for an ever higher bypass ratio, ineluctably leads designers to increase the diameter of the fan compared to that of the core of the turbojet.

The main consequence of the friction encountered resides in a premature wear of the engine, which naturally adversely affects the lifetime of said engine, as well as its performance.

Moreover, it should be pointed out that other phenomena of flexing of the engine, capable of leading to friction between the turning compressor and turbine blades and the delivery casing of the engine, may occur further to gusts of wind brought to bear for example vertically or horizontally.

OBJECT OF THE INVENTION

The aim of the invention is therefore to propose an assembly for aircraft that overcomes, at least partially, the above mentioned disadvantages relative to the prior art, and also to present an aircraft having at least one such assembly.

In order to achieve this, the object of the invention is an aircraft engine assembly according to claim 1.

In the engine assembly according to the invention, the taking up of stresses generated by the turbojet is achieved exclusively on the fan casing by means of all of the engine mounts, and consequently allows the delivery casing of said turbojet to be no longer directly connected to the attachment strut by one or several rear mounts, as was the case in embodiments of the prior art.

Thus, said specific arrangement of the engine mounts leads to a considerable reduction in the flexing encountered at the level of the delivery casing, whether said flexing is due to the thrust stresses generated by the turbojet, or instead to the gusts of air likely to be encountered during the various phases of flight of the aircraft.

Consequently, the above mentioned reduction in flexing leads to a significant reduction in the friction between the rotating compressor and turbine blades and the delivery casing of the engine, and thereby limits to a great extent the losses in efficiency due to wear of said blades.

The fact of providing for the engine mounts on the fan casing offers the possibility of considerably distancing them from each other. This wide separation has the advantage of being able to considerably simplify the design of said engine mounts, due to the fact that stresses that they have to take up, associated with a moment along a given axis, are naturally lowered compared to those encountered in the conventional solutions of the prior art in which the engine mounts located on the delivery casing could not be as far apart from each other.

Finally, it is pointed out that the engine mounts and the attachment strut may advantageously be located at a distance from the hot part of the turbojet, which leads to a significant reduction in the heat effects likely to apply to these elements.

Preferably, the plurality of engine mounts consists of a first engine mount and a second engine mount located in a symmetrical manner in relation to a plane defined by a longitudinal axis of the turbojet and a vertical direction of said turbojet, as well as a third engine mount traversed by said same plane.

In this configuration, one may then provide that the first, second and third engine mounts are attached to a peripheral annular part of the fan casing, which allows them to occupy positions in which they are advantageously very distant to each other.

Preferentially, the first and second engine mounts are traversed by a plane defined by the longitudinal axis of the turbojet and a transversal direction of said turbojet.

Still in a preferential manner, first and second engine mounts are each designed in such a way as to take up the stresses brought to bear along a longitudinal direction of the turbojet and along the direction vertical of said turbojet, and the third engine mount is designed in such a way as to take up the stresses brought to bear along this same longitudinal direction of the turbojet and along a transversal direction of said turbojet.

In a preferred manner, the attachment strut of the engine assembly comprises a rigid structure comprising a plurality of cradles arranged in such a way as to jointly delimit a part of an imaginary surface substantially cylindrical of circular section.

Thus, each of the cradles provided has a curve that allows it to extend around said imaginary surface substantially cylindrical of circular section. Consequently, they jointly form an assembly of the rigid structure that is advantageously capable of only being very slightly restrictive in terms of perturbation of the bypass air escaping from the annular duct of the turbofan of the turbojet, compared to the conventional solutions of the prior art in which the attachment strut had the form of a centre box of large dimensions, arranged in a manner very close to the delivery casing of the turbojet.

Indeed, it is possible to provide that a diameter of the imaginary surface is substantially identical to a diameter of an external cylindrical surface of the fan casing, implying that the rigid assembly formed by the plurality of cradles is then located substantially in the same line as said external surface of the fan casing, and more generally in the same line as the peripheral annular part of said casing. Naturally, in this precise case where the plurality of cradles is assimilable to a portion of an envelope substantially cylindrical of circular section and of diameter close to that of the fan casing, the perturbations of the bypass air caused by said plurality of cradles are extremely low, or even virtually inexistent.

This then advantageously makes it possible to obtain savings in drag, in turbojet output, and in fuel consumption.

By way of indication, it is noted that although the plurality of cradles is assimilable in a general manner to a portion of an envelope substantially cylindrical of circular section, it preferably takes the form of a portion of an envelope substantially cylindrical of semi-circular section, the notion of "portion" obviously being present due to the empty spaces located between the different cradles. Naturally, this preferred form is completely suited to assuring an easy assembly of the turbojet on the rigid structure of the attachment strut.

Preferably, the plurality of cradles comprises at least one annular portion shaped cradle substantially centred on a longitudinal axis of the imaginary surface, said longitudinal axis being parallel to the longitudinal direction of the turbojet, and preferentially merged with the longitudinal axis of said turbojet. By way of illustration, it is on such an annular portion shaped cradle that the totality of the above mentioned engine mounts may be attached.

Moreover, the rigid structure of the attachment strut may comprise a centre box, also known as a centre torsion box, which extends parallel to the longitudinal axis of the imaginary surface, and which is integral with each annular portion shaped cradle. Obviously, the mechanical strength provided by the cradles allows said box to have smaller dimensions than those of the prior art, principally with regard to its thickness. This implies that said centre box is also capable of only causing very slight perturbations of the bypass air escaping from the annular duct of the turbofan. Moreover, it should also be noted that the low thickness of the centre box is allowed due to the fact that it is no longer provided to interpose a rear engine mount between said same box and the delivery casing of the turbojet, and that it is consequently no longer necessary to bring the box as near as possible to said casing, as was the case in the prior art.

Preferably, the plurality of cradles further comprises two lateral cradles for taking up thrust stresses arranged respectively on either side of the centre box, each of the two lateral cradles being integral on the one hand with each annular portion shaped cradle, and on the other hand with the centre box.

The taking up of thrust stresses generated by the turbojet may then advantageously be achieved with elements forming an integral part of the rigid structure of the attachment strut. Thus, it is no longer necessary to provide for an additional device for taking up thrust stresses of the lateral connecting rod type, as was the case in the solutions known to the prior art.

In this respect, still with the aim of taking up said thrust stresses, one may provide that the plurality of cradles further comprises two secondary lateral cradles for taking up thrust stresses arranged respectively on either side of the centre box, each of said two secondary lateral cradles being integral on the one hand with at least one annular portion shaped cradle, and on the other hand with the centre box.

Moreover, the plurality of cradles may also comprise two supporting cradles for the lateral cradles for taking up thrust stresses, said two supporting cradles being arranged respectively on either side of the centre box and each integral on the one hand with one of the two lateral cradles, and on the other hand with the centre box. Advantageously, the supporting cradles are arranged in such a way as to work in traction, and make it possible to avoid the bending of the lateral cradles for taking up thrust stresses.

A further aim of the invention is an aircraft comprising at least one engine assembly such as that which has just been described.

Other advantages and characteristics of the invention will become clearer from the non-limitative detailed description that follows.

BRIEF DESCRIPTION OF DRAWINGS

This description will be made with regard to the appended drawings among which.

DETAILED DESCRIPTION OF PREFERRED EMBODIMENTS

Figure 1:
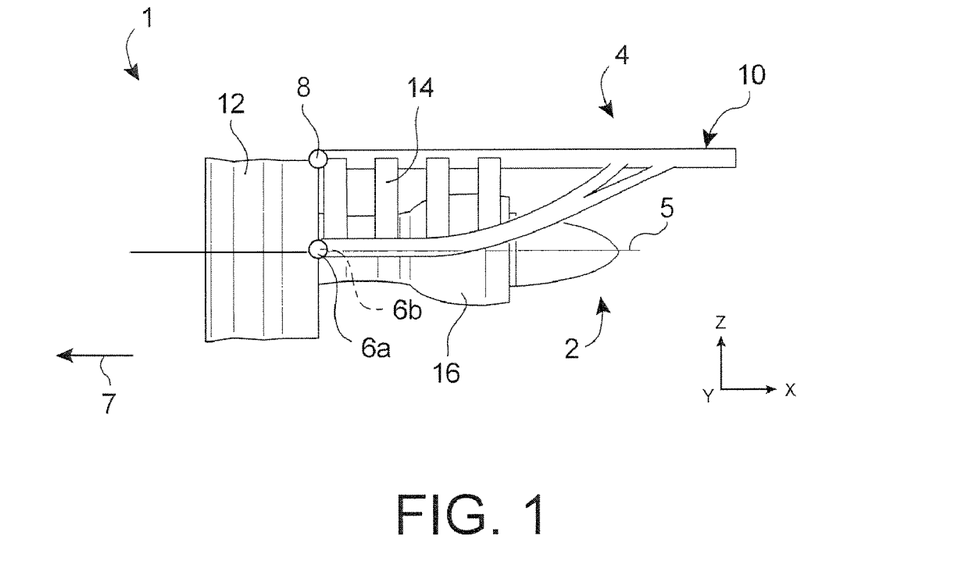
FIG. 1 represents a side view of an engine assembly for aircraft, according to a preferred embodiment of the present invention.

In reference to FIG. 1, an engine assembly 1 for aircraft according to a preferred embodiment of the present invention is shown, said assembly 1 being intended to be attached underneath the wing of an aircraft (not represented).

Overall, the engine assembly 1 comprises a turbojet 2, an attachment strut 4, as well as a plurality of engine mounts 6a, 6b, 8 assuring the attachment of the turbojet 2 under said strut 4 (the mount 6b being masked by the mount 6a in this FIG. 1). By way of indication, it is noted that the assembly 1 is intended to be enclosed within a nacelle (not represented), and that the attachment strut 4 comprises another series of mounts (not represented) that make it possible to assure the suspension of said assembly 1 under the wing of the aircraft.

Throughout the description that follows, by convention, X is taken to mean the direction parallel to a longitudinal axis 5 of the turbojet 2, Y the direction oriented transversally in relation to said same turbojet 2, and Z the vertical or height direction, said three directions being orthogonal to each other.

On the other hand, the terms "forward" and "rear" should be considered in relation to a direction of progress of the aircraft encountered following the thrust exercised by the turbojet 2, said direction being schematically represented by the arrow 7.

In FIG. 1, it may be seen that only a rigid structure 10 of the attachment strut 4 has been represented. The other constituent elements not represented of said strut 4, such as the secondary structure assuring the segregation and the support of systems while at the same time bearing the aerodynamic fairings, are conventional elements identical or similar to those encountered in the prior art, and known to those skilled in the art. Consequently, no detailed description will be made herein.

On the other hand, the turbojet 2 has at its front a fan casing 12 of large dimensions delimiting a turbofan annular duct 14, and comprises towards the rear a delivery casing 16 of smaller dimensions, enclosing the core of said turbojet. The casings 12 and 16 are obviously integral with each other.

As may be seen in FIG. 1, the particularity of the invention resides in the fact that the engine mounts 6a, 6b, 8, three of which are preferably provided, are all attached to the above mentioned fan casing 12.

Figure 2:
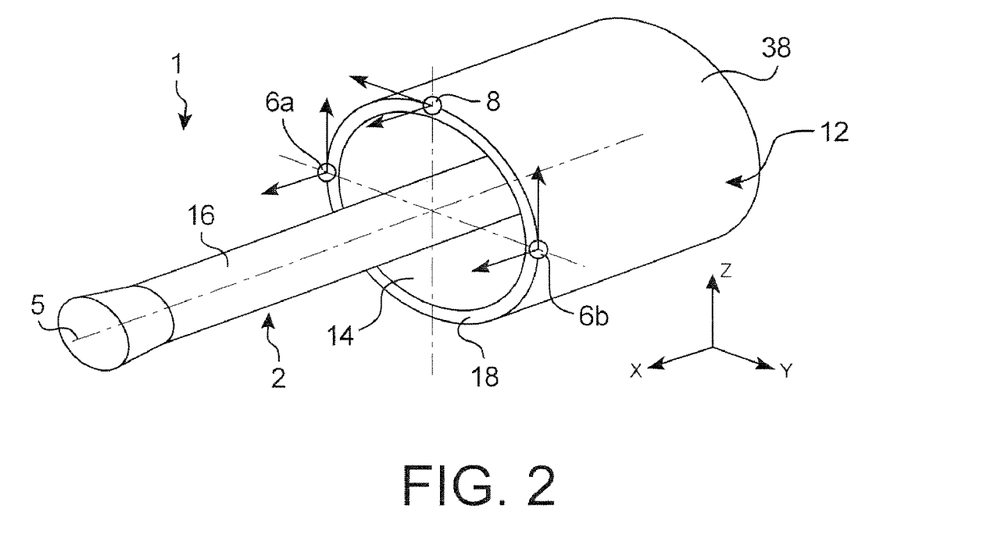
FIG. 2 represents a schematic perspective view of the assembly represented in FIG. 1, the attachment strut having been removed to allow the engine mounts to appear more clearly.

Indeed, in reference now to FIG. 2, it may be seen that the first mount 6a and the second mount 6b represented schematically are arranged in a symmetrical manner in relation to a first plane (not represented) defined by the longitudinal axis 5 and the direction Z.

More precisely, the mounts 6a, 6b are both attached to a peripheral annular part 18 of the fan casing 12, and preferably on the rear of said part 18, as is represented schematically.

One may then provide that the first and second engine mounts 6a, 6b are diametrically opposite the peripheral annular part 18 having an external cylindrical surface 38 of the fan casing 12, in such a way that said mounts 6a, 6b are therefore each traversed by a second plane defined by the longitudinal axis 5 and the direction Y.

As has been shown schematically by the arrows in FIG. 2, each of the first and second engine mounts 6a, 6b is designed in such a way as to be able to take up the stresses generated by the turbojet 2 along the direction X and along the direction Z, but not those brought to bear along the direction Y.

In this way, the two mounts 6a, 6b separated widely apart from each other jointly assure the take up of the moment brought to bear along the direction X, and that of the moment brought to bear along the direction Z.

Still in reference to FIG. 2, it may be seen that the third engine mount 8 represented schematically is also attached to the peripheral annular part 18 of the fan casing 12, also preferably on the rear of said part 18.

By way of indication, it is pointed out that the mounts 6a, 6b, 8 are attached to the peripheral annular part 18 of the casing 12 through the intermediary of structural parts (not represented) of the engine, which are effectively preferably arranged on the rear of the peripheral annular part 18. Nevertheless, it is also possible to encounter engines in which structural parts are located more towards the front on the peripheral annular part 18, meaning that the mounts 6a, 6b, 8 are also attached more towards the front of the engine, again on the peripheral annular part 18 of the fan casing 12.

As regards the third mount 8, this is located on the highest part of the fan casing 12, thus on the highest part of the peripheral annular part 18, and is consequently traversed in an imaginary manner by the first plane indicated above.

As is shown schematically by the arrows in FIG. 2, the third engine mount 8 is designed in such a way as to be able to take up the stresses generated by the turbojet 2 along the direction X and along the direction Y, but not those brought to bear along the direction Z.

In this way, said third mount 8 assures jointly with the two mounts 6a, 6b the take up of the moment brought to bear along the direction Y.

It is noted that if the engine mounts 6a, 6b, 8 have been represented schematically in FIGS. 1 and 2, it should be understood that said mounts may be formed in any manner known to those skilled in the art, such as for example those relative to the assembly of shackles and brackets.

As has been stated previously, the principal advantage associated with the configuration that has just been described resides in the fact that the total liberty of the delivery casing 16 vis-à-vis the engine mounts 6a, 6b, 8 leads to a considerable reduction in the flexing of said casing during the various flight situations of the aircraft, and thereby results in a significant reduction in the wear caused by the compressor and turbine blades rubbing against said delivery casing 16.

Figure 3:
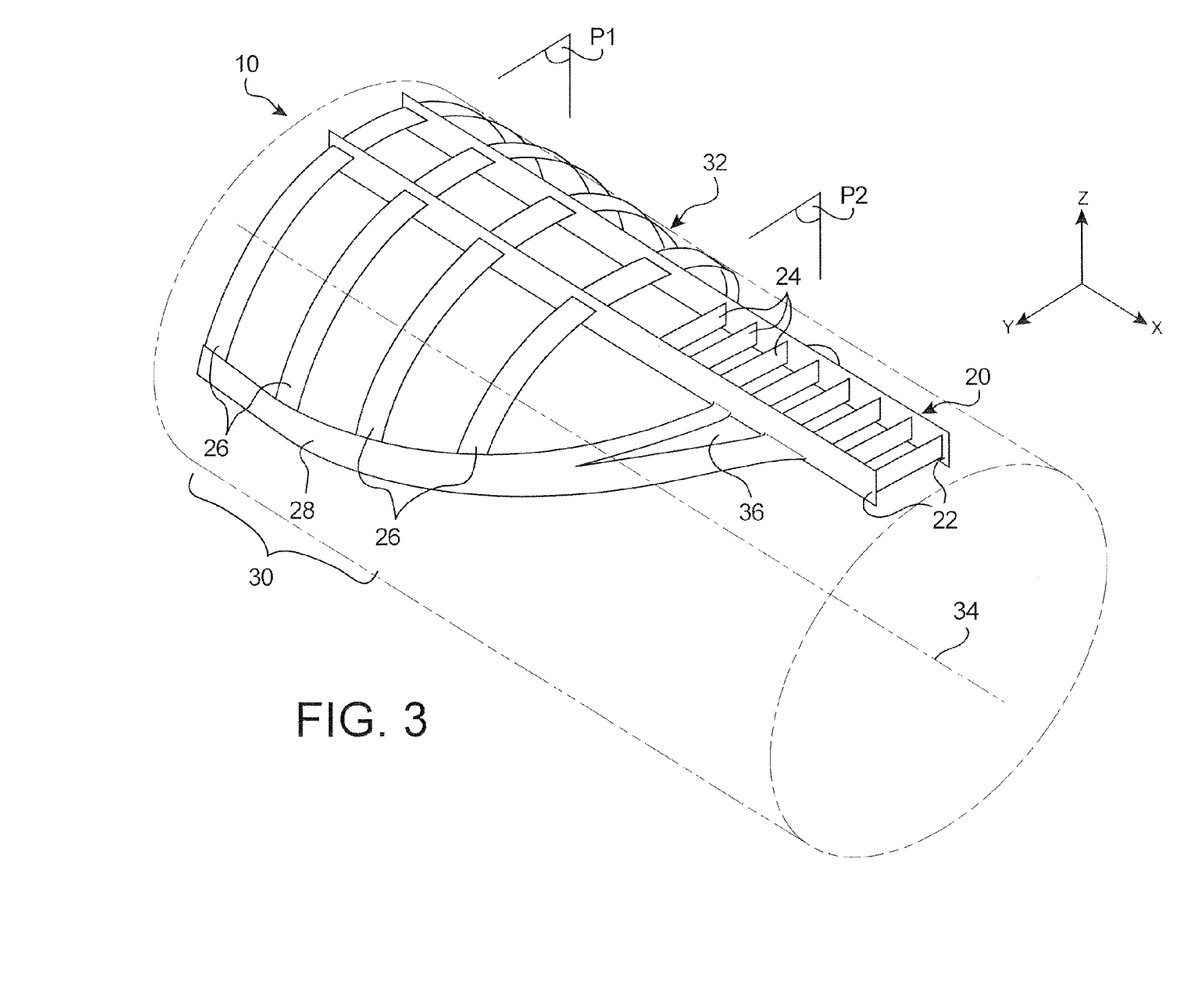
FIG. 3 represents a magnified perspective view of the attachment strut of the engine assembly of FIG. 1.

In reference now to FIG. 3, one can see in a detailed manner the attachment strut 4 of the engine assembly 1, and more precisely its rigid structure 10.

Firstly, it is pointed out that said rigid structure 10 is designed in such a way as to have a symmetry in relation to the first plane indicated above, in other words in relation to the vertical plane defined by the longitudinal axis 5 of the turbojet 2, and the direction Z.

Said rigid structure 10 comprises a centre torsion box 20, which extends from one end to the other of the structure 10 in the direction X, parallel to said same direction. By way of indication, said box 20 may be formed by the assembly of two lateral spars 22 extending along the direction X in the parallel planes XZ, and joined to each other through the intermediary of cross ribs 24 that are, for their part, oriented in the parallel planes YZ.

A plurality of cradles 30 is provided to complete the rigid structure 10, the centre box 20 of which is located at the level of an upper portion of said same structure 10, each of the cradles being integral with the centre torsion box 20 and protruding on either side of it along the direction Y.

The particularity of said plurality of cradles 30 is that it delimits a part of an imaginary surface 32 substantially cylindrical of circular section, and the longitudinal axis 34 parallel to the centre box 20, as represented in FIG. 3. In other words, the cradles 26, 28 constituting the plurality of cradles 30 each have a suitable curvature to be able to be positioned around and in contact with said imaginary surface 32, over their whole length. Thus, in a general manner, the plurality of cradles 30 forms a portion of an envelope/cage substantially cylindrical of circular section, capable of being positioned around and distant from the delivery casing 16 of the turbojet 2.

Among the plurality of cradles 30, one notes firstly the presence moreover of annular portion shaped cradles 26 that are substantially centred on the longitudinal axis 34 of the imaginary surface 32, said surface being preferably merged with the longitudinal axis 5 of the turboprop engine 2.

Said cradles 26 are thus each spaced out along the direction X, and arranged in the parallel planes YZ. Moreover, they are integral with the centre box 20 that traverses each of them in their middle. More specifically, each annular portion shaped cradle 26 traverses the two lateral spars 22, and is rigidly attached to said two spars, for example by welding or by mechanical assembly.

By way of indication, said cradles 26 may each be formed in one piece, or even for example by means of two identical parts held rigidly against each other.

In the embodiment represented in FIG. 3, the cradles 26 are four in number, and have a length that diminishes as they approach the rear of the structure 10. Indeed, it is noted that the cradle 26 located the most to the front of the structure 10 and integral with a forward end of the centre box 20, has the shape of a cradle the two ends of which are consequently arranged substantially at the level of the plane XY going through the longitudinal axis 34, said plane being identical to the above mentioned second plane. The second cradle 26 has for its part a slightly shorter length than that of a cradle, and so on until the final cradle 26 located for example at the level of a central portion of the box 20, considered along the direction X.

It is noted that the forward part of the centre box 20 traversed by the annular portion shaped cradles 26 does not necessarily require cross ribs 24 to be incorporated, since the two lateral spars 22 are connected to each other by the upper part of said cradles 26.

The plurality of cradles 30 further comprises two lateral cradles for taking up thrust stresses 28 (only one being visible in FIG. 3, due to the perspective view). Said cradles 28 are effectively arranged in such a way as to be able to take up the thrust stresses generated by the turbojet 2 during the different flight phase of the aircraft, with the obvious aim of limiting the longitudinal flexing of said turbojet 2, and more precisely that of its fan casing 12.

A cradle 28 is arranged on each side of the centre box 20, and has a forward part rigidly joined to the cradles 26, as well as a rear part rigidly joined to the centre box 20. More specifically, each of the two cradles 28 has a front end integral with one of the two ends of the forward-most cradle 26, and extends rearwards and upwards while being rigidly joined to one of the two ends of each of the other cradles 26. Then, its rear end fits onto the lateral spar 22 located on the same side as the cradle 28 concerned, at the level of a central part of the box 20. It should be noted that a reinforcement 36 may be added to strengthen the mechanical linkage established between the rear end of the cradle 28 and the associated lateral spar 22, said linkage being for example obtained by welding or by mechanical assembly.

Figure 4A:
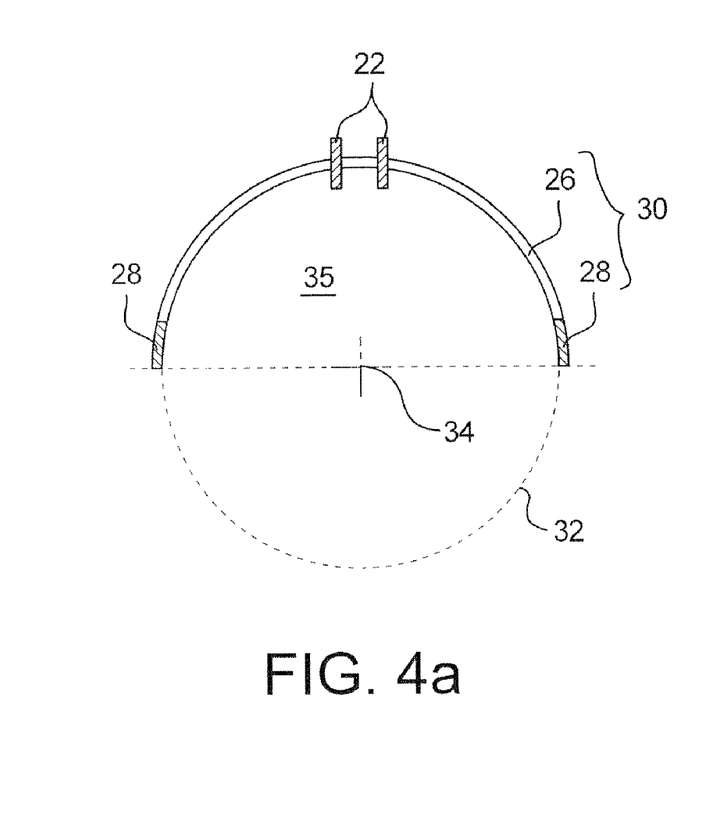
FIGS. 4a and 4b represent respectively cross-sectional views taken along the transversal planes P1 and P2 of FIG. 3.
Figure 4B:
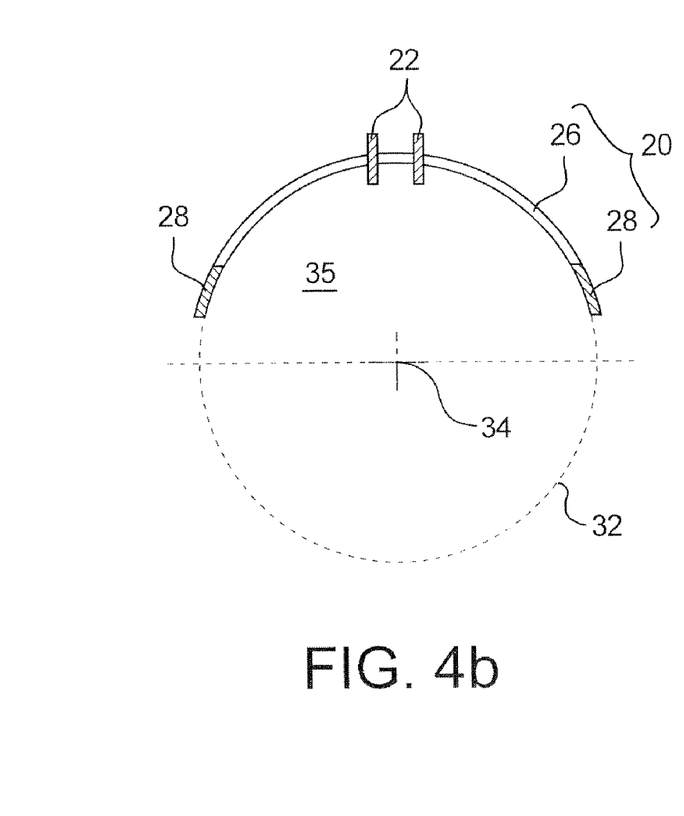

FIG. 4a represents a cross-sectional view taken along a transversal plane P1 located between the two forward-most cradles 26, and FIG. 4b represents a cross-section view taken along a plane P2, also transversal, located to the rear of the rearmost cradle 26, but forward of the junction between the cradle 28 and centre box 20.

Figure 4C:
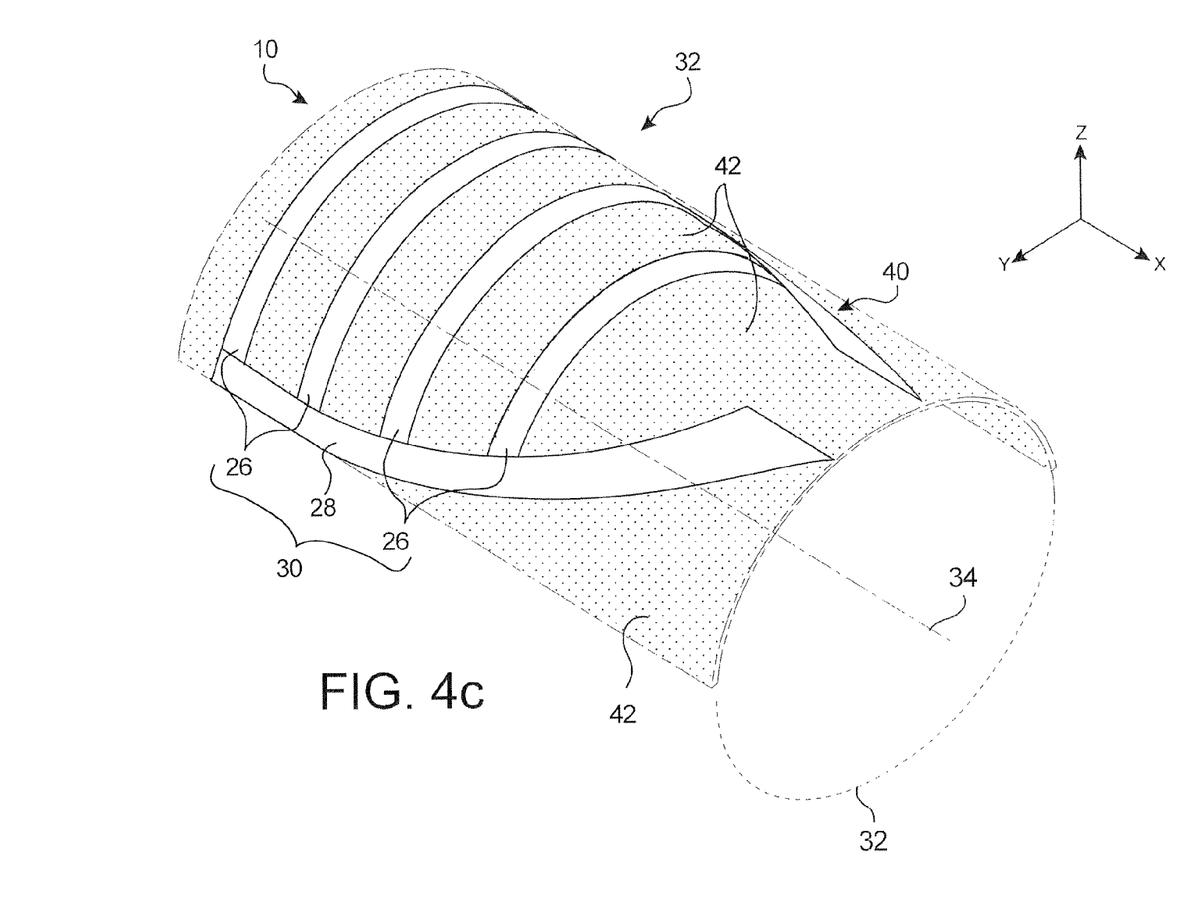
FIG. 4c represents a perspective view intended to explain the shape of the plurality of cradles provided to partially constitute the attachment strut of FIG. 3.

In these figures, it may effectively be seen that the plurality of cradles 30 delimits a part of the imaginary surface 32 substantially cylindrical of circular section, and that said plurality of cradles 30 indeed constitutes a portion of an envelope/cage substantially cylindrical of semi-circular section centred on the longitudinal axis 34, as will also be described in reference to FIG. 4c.

It is noted that in order to create the least possible perturbation of the bypass air escaping from the turbofan annular duct 14, the diameter of the imaginary cylindrical surface 32 is preferably substantially identical to the diameter of the external cylindrical surface 38 of the annular part 18 of the fan casing 12. Furthermore, as may be seen in FIGS. 4a and 4b, the lateral spars 22 only protrude over a very small distance within the space 35 delimited by the imaginary surface 32, in such a way that also they do not perturb significantly the flow of the bypass air. This is explained particularly by the fact that the spars 22 have a height alone the direction Z that is extremely small compared to the diameter of the imaginary 32 and 38 surfaces. Moreover, it is only a lower part of said spars 22 that penetrates within the interior of the space 35, the other part being located above the plurality of cradles 30.

In order to illustrate in a schematic manner the preferred shape of the plurality of cradles 30, FIG. 4c shows that each constitutes one part only of an envelope/cage 40 substantially cylindrical of semi-circular section, centred on the longitudinal axis 34 and surrounding the upper half of the imaginary surface 32. Thus, in this FIG. 4c, the parts 42 represented in a hatched manner correspond to the missing parts of the plurality of cradles 30 to form the complete half-cylinder 40. Furthermore, this representation also makes it possible to understand the fact that the plurality of cradles 30 substantially forms an extension towards the rear of the peripheral annular part 18 of the fan casing 12.

Figure 5:
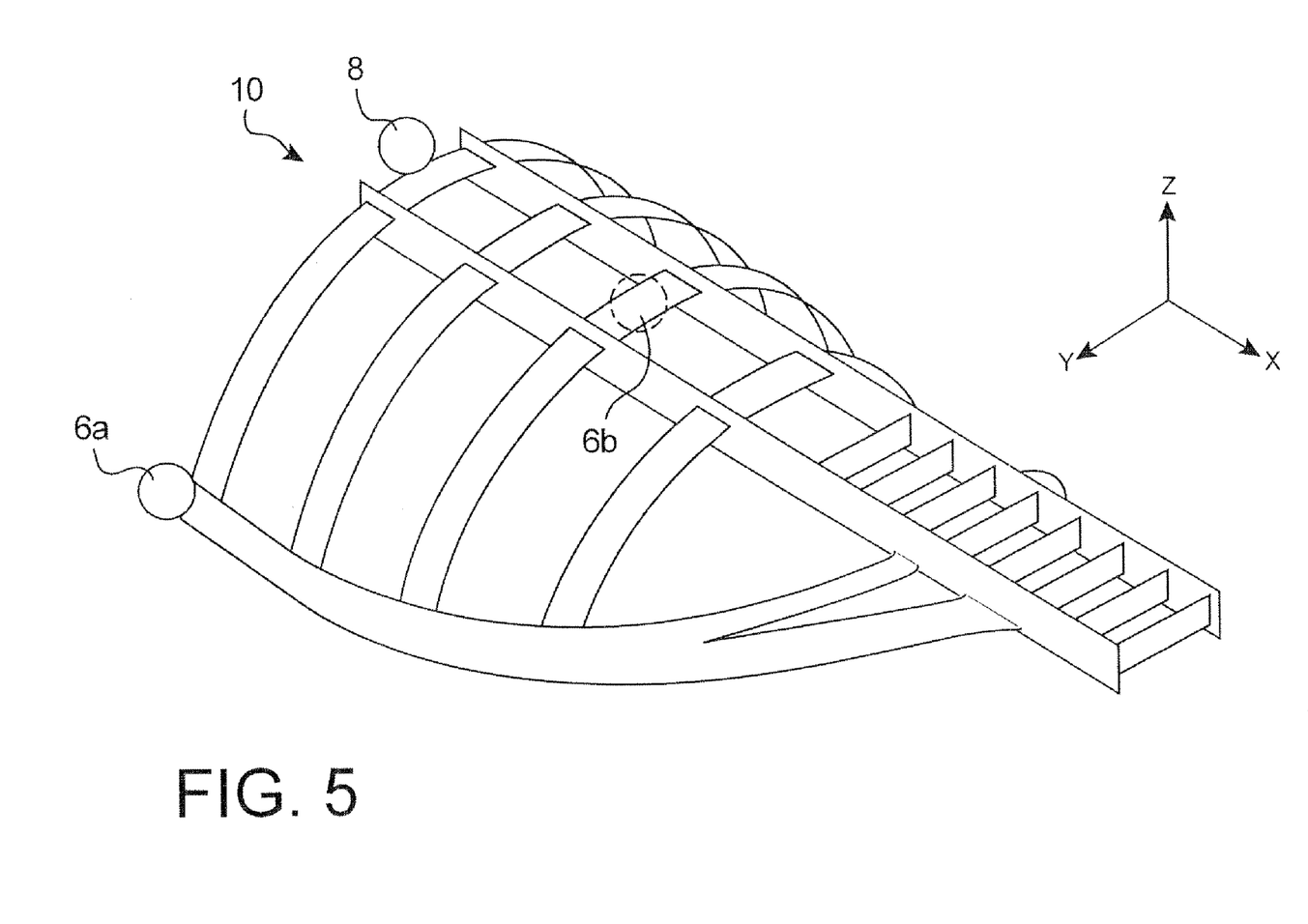
FIG. 5 represents a view similar to that shown in FIG. 3, to which has been added a schematic representation of the engine mounts fastened to the attachment strut.

In reference to FIG. 5, it may be seen that the rigid structure 10 of the attachment strut 4 is completed suited to supporting the engine mounts 6a, 6b, 8, since said mounts may easily be attached to the forward-most cradle 26. Indeed, the first and second mounts 6a, 6b are respectively attached to the two ends of said forward-most cradle 26 in the shape of a half ring, whereas the third mount 8 is integral with the upper part of said same cradle 26, located between the two lateral spars 22 of the centre box 20. Moreover, in the case selected where the centre box 20 has an upper horizontal spar and a lower horizontal spar (not represented for reasons of clarity) closing said box 20 respectively towards the top and bottom, the third mount 8 is then also located between said two horizontal spars of the centre box 20.

By way of illustration, all of the elements making up the rigid structure 10 that has just been described may be formed by means of metallic materials, such as steel, aluminium, titanium or even by means of composite materials, preferably in carbon. Moreover, the cradles of the plurality of cradles 30 may each take the form of a curved strip of sheet metal.

Figure 6:
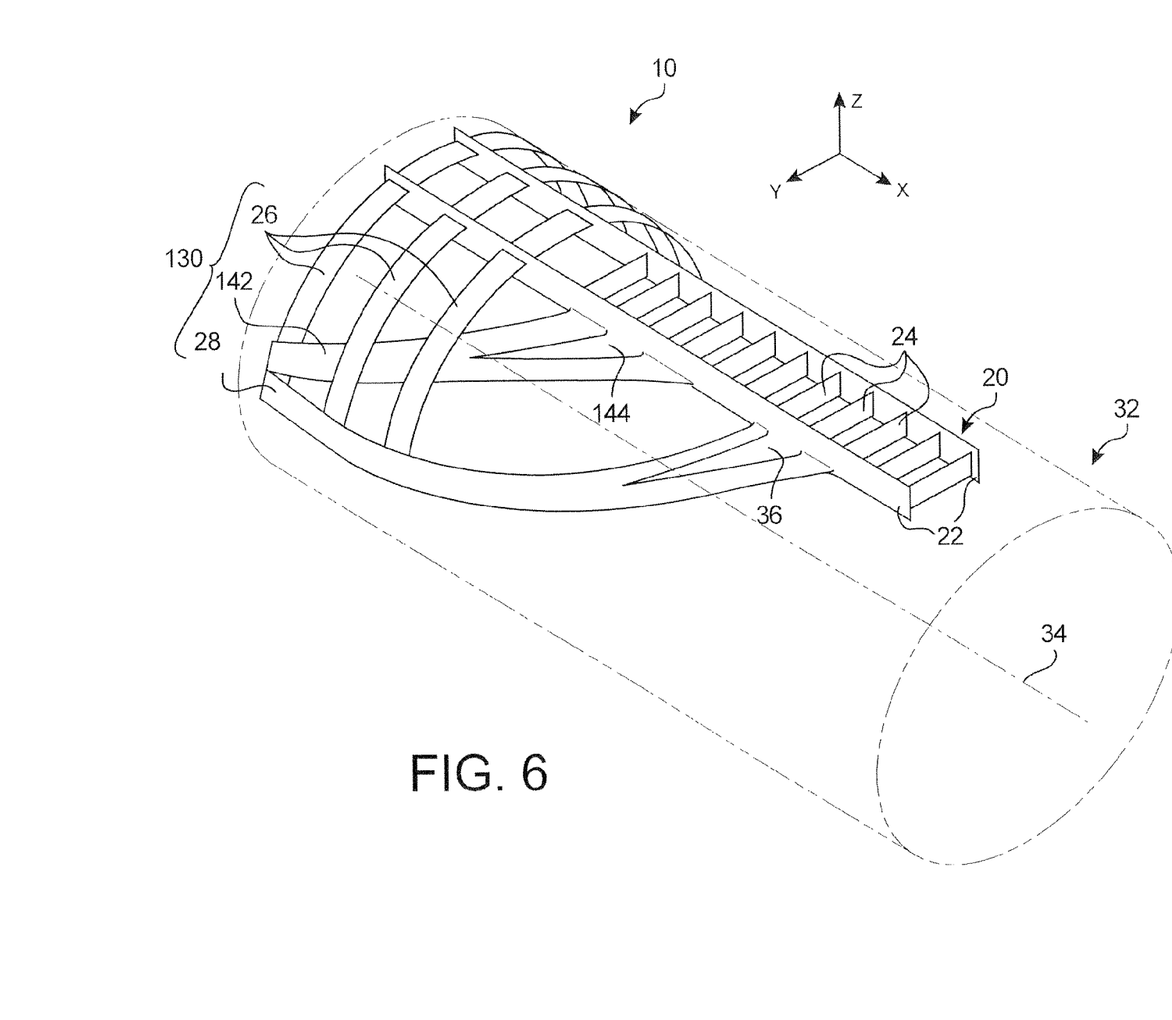
FIG. 6 represents a view similar to that shown in FIG. 3, in which the attachment strut is in the form of a first alternative.
Figure 7:
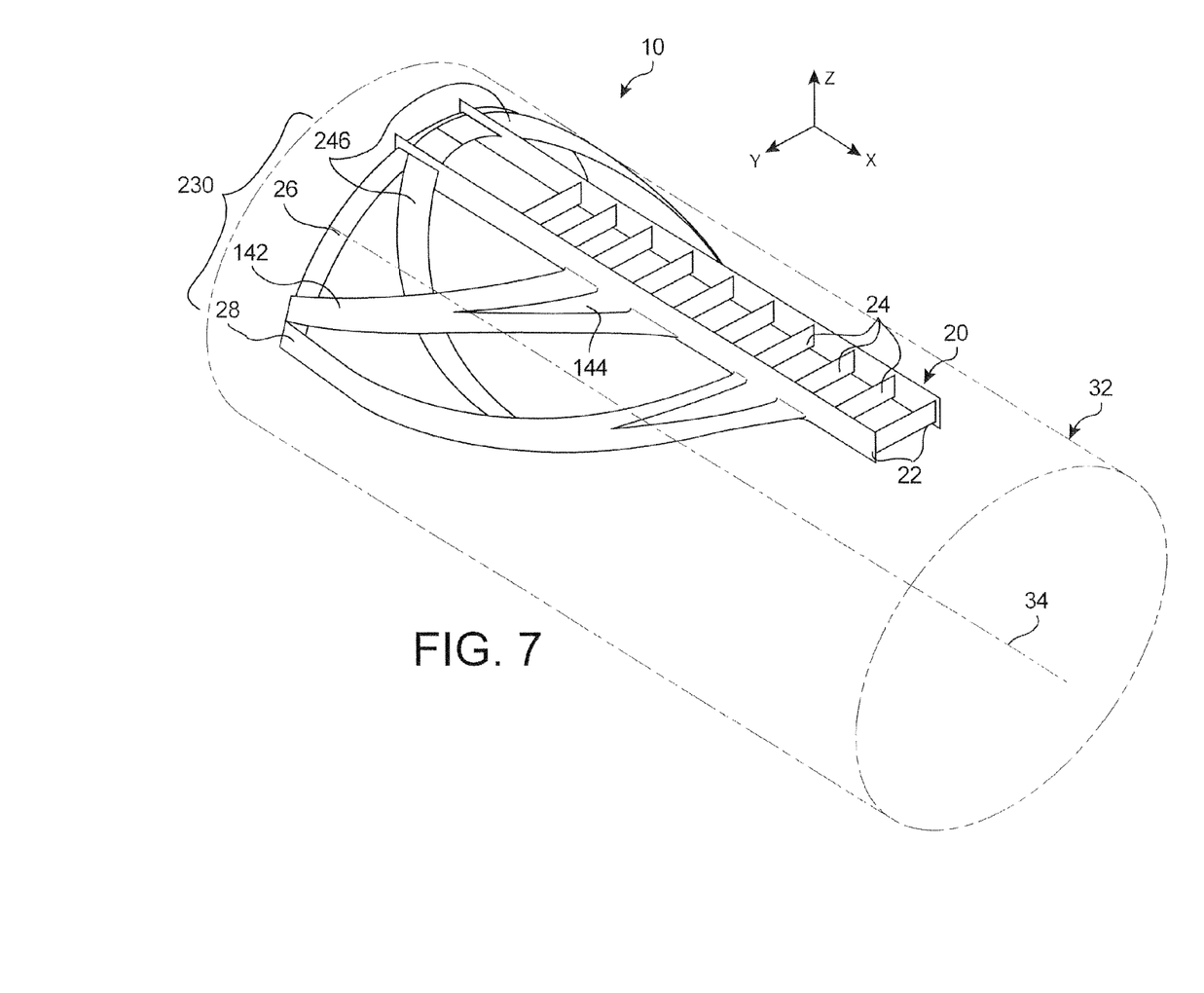
FIG. 7 represents a view similar to that shown in FIG. 3, on which the attachment strut is in the form of a second alternative.

FIGS. 6 and 7 represent respectively first and second embodiments of the rigid structure 10 described above in reference to FIG. 3. Thus, in all of the figures, elements bearing the same numerical references correspond to identical or similar elements.

Firstly in reference to FIG. 6 representing the first alternative, it is noted that although the plurality of cradles 130 has been modified compared to the plurality of cradles 30 described previously, said plurality is still formed in such a way as to delimit a part of the imaginary surface 32 substantially cylindrical of circular section, and to constitute preferably a part of an envelope/cage substantially cylindrical of semi-circular section, centred on the longitudinal axis 34.

The modifications made in relation to the plurality of cradles 30 are two in number, since the annular portion shaped cradle 26 located most to the rear of the rigid structure 10 has been removed and that, on the other hand, two secondary lateral cradles have been added for taking up thrust stresses 142, the aim of which is to fulfil a similar role to that of the cradles 28.

A cradle 142 is arranged on each side of the centre box 20, and has a front end rigidly joined to one of the two ends of the forward-most cradle 26, the mechanical linkage formed being located for example just above the attachment between said same forward cradle 26 and the cradle 28. Moreover, the secondary lateral cradle for taking up thrust stresses 142 extends downwards and upwards until its rear end fits together on the lateral spar 22 located on the same side as said cradle 142, at the level of a central part of the box 20. Once again, a reinforcement 144 may be added to strengthen the mechanical linkage established between the rear end of the cradle 142 and the associated lateral spar 22, said linkage being for example obtained by welding or by mechanical assembly.

Moreover, it is noted that the secondary lateral cradle for taking up thrust stresses 142 may cross the two other annular portion shaped cradles 26 without necessarily being integral with them.

In reference to FIG. 7 representing the second alternative, it is noted that the plurality of cradles 230 has been modified compared to the plurality of cradles 130 that have just been described, but that said plurality is still formed in such a way as to delimit a part of the imaginary surface 32 substantially cylindrical of circular section, and to constitute preferably a part of an envelope/cage substantially cylindrical of semicircular section, centred on the longitudinal axis 34.

The modifications made compared to the plurality of cradles 130 also number two, since only the forward annular portion shaped cradle 26 has been conserved, and that, moreover, two supporting cradles 246 for the cradles for taking up thrust stresses 28 have been added.

A support cradle 246 is arranged on each side of the centre box 20, and has a front end rigidly joined to a forward part of said box 20. Furthermore, the support cradle 246 extends backwards and downwards until its rear end fits onto the cradle for taking up thrust stresses 28 located on the same side as said cradle 246, at the level of a substantially central part of said cradle 28.

With such an arrangement, the supporting cradles 246 working in traction make it possible for the cradles for taking up thrust stresses 28 not to bend during the different phases of flight of the aircraft, and thereby avoiding a significant spreading to occur between the two cradles 28 and 142 of a same side of the rigid structure 10.

It should be noted that on each side of the rigid structure 10, in side view, the cradles 142 and 246 form substantially an X. Moreover, the support cradle 246 may cross the secondary lateral cradle for taking up thrust stresses 142 without necessarily being integral with it.

As may be seen in FIG. 7, it is possible to provide that the two forward ends of the two cradles 246 are integral with each other, for example by welding or by mechanical assembly, between the two lateral spars 22 to which they are also respectively joined. Naturally, it could have been envisaged to replace the two cradles 246 by a unique support cradle formed in one piece and extending on either side of the centre box 20, without going beyond the scope of the invention.

Finally, as may be clearly seen in FIGS. 3, 6 and 7, the centre box 20 of the first and second embodiments of the strut 4 may also undergo several minor modifications, for example as regards the arrangement and the number of cross ribs 24.

Figure 8A:
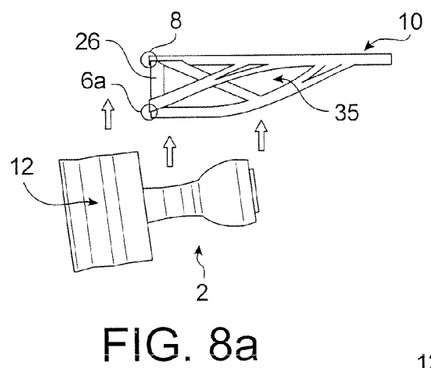
FIGS. 8a to 8c represent side views illustrating different successive steps of the operation of assembling the turbojet on the attachment strut represented in FIG. 7.
Figure 8B:
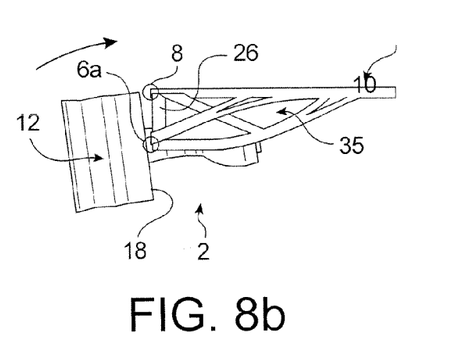
Figure 8C:
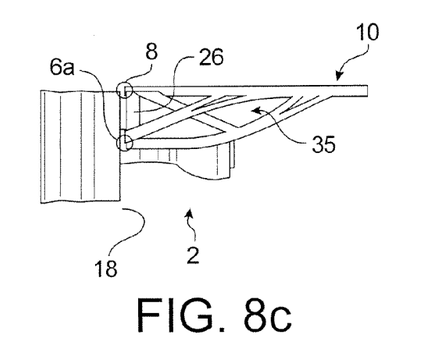

FIGS. 8a to 8c represent views illustrating different successive steps of the operation for assembling the turbojet 2 on the rigid structure 10 that has just been described, in other words that in the form of the second embodiment.

Firstly, as illustrated by the arrows in FIG. 8a, the turbojet 2 located in a position where its front end is sloping slightly downwards undergoes a displacement upwards, for example by means of a conventional lifting truck (not represented), in the direction of the rigid structure 10 maintained fixedly.

When the turbojet 2 has been raised sufficiently to penetrate within the space 35 defined by the imaginary surface 32 (not represented in this figure), the mounts 6a, 6b, are put in place respectively between the ends of the forward cradle 26 and the peripheral annular part 18 of the fan casing 12.

Then, the turbojet 2 is pivoted around the first and second mounts 6a, 6b in such a way that its fan casing 12 can rise up, as is schematically represented by the arrow in FIG. 8b. FIG. 8c, for its part, shown that the pivoting of the turbojet 2 is stopped from the moment that the peripheral annular part 18 is sufficiently close to the forward cradle 26 to allow the third engine mount 8 to be put in place.

Figure 9:
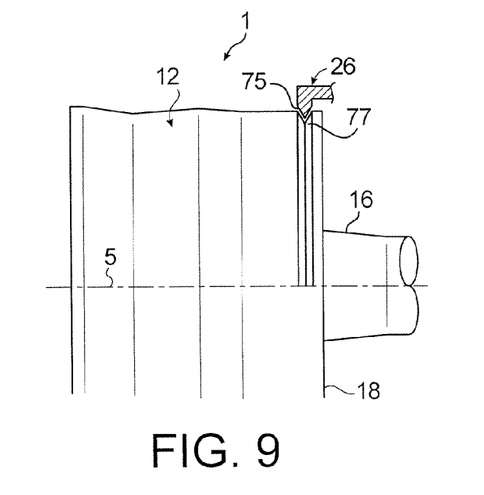
FIG. 9 represents a partial side view of an engine assembly for aircraft, according to another preferred embodiment of the present invention.

In reference now to FIG. 9, an engine assembly 1 for aircraft according to another preferred embodiment of the present invention is shown in a very partial and simplified manner, said assembly 1 being substantially identical to that which has just been described.

The particularity of this other preferred embodiment resides in the fact that the forward-most annular portion shaped cradle 26 (the remainder of the attachment strut 4 is not represented in this FIG. 9), has a protuberance 75 oriented within and cooperating with a groove 77 formed on the rear on the peripheral annular part 18 of the fan casing 12.

The groove 77, for example a V-groove, corresponds preferably to the groove normally formed on the peripheral annular part 18 to assure the attachment of a reverse thrust device. Said groove is typically half-spherical and extends overall on the upper part of the casing 12 between the positions of the mount 6a and the mount 6b (not represented).

Thus, in the case where the engine is not equipped with such a reverse thrust device, the protuberance 75 of the forward-most cradle 26, which extends preferably over the whole length of said cradle and which has preferentially a V-shaped section, can thereby easily fit into the groove 77.

In this way, the cooperation between the protuberance 75 and the groove 77 makes it possible to assure the taking up of stresses brought to bear along the direction X, in a hyperstatic manner. Consequently, the mounts 6a, 6b, 8 advantageously no longer have to assure the taking up of stresses brought to bear along said direction X.

It is moreover pointed out that in such a configuration, during the mounting of the engine assembly, it is first of all necessary to position the protuberance 75 of the annular portion shaped cradle 26 in the groove 77 located on the peripheral annular part 18 of the fan casing 12, before assembling the different mounts 6a, 6b, 8.

Obviously, various modifications may be made by those skilled in the art to the engine assembly 1 for aircraft that has just been described, uniquely by way of example and in nowise limitative. In this respect, it may in particular be stated that although the engine assembly 1 has been shown in a configuration suited to it being suspended under the wing of the aircraft, said assembly 1 could also be in a different configuration allowing it to be mounted above said same wing.

The invention claimed is:

1. An engine assembly for aircraft comprising:
a turbojet including a fan casing;
an attachment strut, the attachment strut includes a rigid structure which includes a plurality of cradles arranged in a manner so as to define a portion of a substantially cylindrical surface with a circular cross section; and a plurality of engine mounts interposed between the attachment strut and the turbojet, wherein attachment of the turbojet on the strut is made with the plurality of engine mounts, wherein each of the engine mounts is directly attached to a peripheral annular part of the fan casing of the turbojet, wherein the plurality of cradles includes at least one annular portion shaped cradle substantially centered on a longitudinal axis of the cylindrical surface, the longitudinal axis being parallel to a longitudinal direction of the turbojet, and wherein each of the engine mounts is attached to a forward-most annular portion shaped cradle.

2. An assembly for aircraft according to claim 1, wherein the plurality of engine mounts includes a first engine mount and a second engine mount located in a symmetrical manner in relation to a plane defined by a longitudinal axis of the turbojet and a vertical direction of the turbojet, and a third engine mount traversed by the same plane.

3. An assembly for aircraft according to claim 2, wherein the first and second engine mounts are traversed by a plane defined by the longitudinal axis of the turbojet and a transversal direction of the turbojet.

4. An assembly for aircraft according to claim 3, wherein a diameter of the cylindrical surface is substantially identical to a diameter of an external cylindrical surface of the fan casing of the turbojet.

5. An assembly for aircraft according to claim 3, wherein the plurality of cradles includes a portion of a substantially cylindrical envelope with a semi-circular cross section.

6. An assembly for aircraft according to claim 2, wherein each of the first and second engine mounts takes loads along a longitudinal direction of the turbojet and along the vertical direction of the turbojet.

7. An assembly for aircraft according to claim 2, wherein the third engine mount takes loads along a longitudinal direction of the turbojet and along a transversal direction of the turbojet.

8. An assembly for aircraft according to claim 2, wherein the third engine mount is disposed on the highest part of the peripheral annular part in a vertical direction of the turbojet.

9. An assembly for aircraft according to claim 1, wherein the rigid structure of the attachment strut comprises a center box extending parallel to the longitudinal axis of the cylindrical surface and integral with each annular portion shaped cradle.

10. An assembly for aircraft according to claim 9, wherein the plurality of cradles further comprises two lateral cradles which take thrust loads arranged respectively on either side of the center box, each of the two lateral cradles being integral with each annular portion shaped cradle and the center box.

11. An assembly for aircraft according to claim 10, wherein the plurality of cradles further comprises two secondary lateral cradles which take thrust loads arranged respectively on either side of the center box, each of the two secondary lateral cradles being integral with at least one annular portion shaped cradle and the center box.

12. An assembly for aircraft according to claim 10, wherein the plurality of cradles further comprises two supporting cradles for the lateral cradles which take thrust loads, the two supporting cradles being arranged respectively on either side of the center box and each integral with one of the two lateral cradles and the center box.

13. An assembly for aircraft according to claim 10, wherein each of the two lateral cradles which takes thrust loads is integral with one end of each annular portion shaped cradle.

14. An assembly for aircraft according to claim 1, wherein at least one annular portion shaped cradle is a half ring.

15. An aircraft comprising at least one engine assembly according to claim 1.

16. An assembly for an aircraft according to claim 1 wherein a forward-most annular portion shaped cradle includes a protrusion, said protrusion cooperates with a groove disposed on a rear portion of a peripheral annular part of the fan casing.

* * * * *